United States Patent
Bonikowski et al.

(10) Patent No.: US 6,480,293 B1
(45) Date of Patent: Nov. 12, 2002

(54) ENCODING OF REQUESTS FOR STATUS IN DOCUMENT ASSEMBLY TREES

(75) Inventors: Gregg A. Bonikowski, Rochester, NY (US); Patrick T. Igoe, Grand Island, NY (US); Michael P. Kirby, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,039

(22) Filed: Nov. 24, 1999

(51) Int. Cl.[7] ............................................... G06K 15/00
(52) U.S. Cl. ...................................................... 358/1.15
(58) Field of Search ................................ 358/1.1, 1.12, 358/1.14, 1.15, 1.16, 1.17, 537–538, 450; 707/1, 100, 102, 500, 514–515; 709/101, 102, 103, 104, 105, 106, 107, 108; 711/165; 382/305, 306, 284

(56) References Cited

U.S. PATENT DOCUMENTS

| | | |
|---|---|---|
| 4,480,546 A | 11/1984 | Fujisawa et al. |
| 5,289,768 A | 3/1994 | Keller |
| 5,553,216 A | 9/1996 | Yoshioka et al. |
| 5,555,803 A | 9/1996 | Holm |
| 5,559,606 A | 9/1996 | Webster et al. |
| 5,604,600 A | 2/1997 | Webster |
| 5,606,395 A | 2/1997 | Yang |
| 5,617,215 A | 4/1997 | Webster et al. |
| 5,631,740 A | 5/1997 | Webster et al. |
| 5,638,752 A | 6/1997 | Hartung et al. |
| 5,646,740 A | 7/1997 | Webster et al. |
| 5,682,247 A | 10/1997 | Webster et al. |
| 5,682,530 A * | 10/1997 | Shimamura .................. 709/104 |
| 5,701,557 A | 12/1997 | Webster et al. |
| 5,710,635 A | 1/1998 | Webster et al. |
| 6,105,053 A * | 8/2000 | Kimmel et al. ............. 709/102 |

\* cited by examiner

Primary Examiner—Arthur G. Evans
(74) Attorney, Agent, or Firm—Fay, Sharpe, Fagan, Minnich & McKee, LLP

(57) ABSTRACT

A digital printing system (10) includes a method to request and receive customized job status information. A document assembly tree (300) is extended to include the ability to enter status report frequency specifications at a compilation node (310), or at any other node, such as an intermediate sheet node (330) or sub-compilation node (342). The method consumes less control bus (31) bandwidth than other systems by providing only the required information at a configurable interval.

7 Claims, 3 Drawing Sheets

ENCODING OF REQUESTS FOR STATUS IN DOCUMENT ASSEMBLY TREES

FIELD OF THE PRESENT INVENTION

The invention relates to the art of digital printing systems, and specifically to a flexible, configurable technique for providing useful print job status information to the printing system operator and to job supervisory and support devices.

BACKGROUND OF THE PRESENT INVENTION

Digital printing systems can be as simple as an office laser printer or can be room size devices that include a plurality of system modules such as paper feeders, mark facilities (for example a black and white print engine and a color print engine), collators, staplers and shrink wrappers. Digital printing systems can even be comprised of networked devices located remotely from one another such as in an on-demand publishing system.

During the printing of large jobs, such as the printing, collating, stapling and shrink wrapping of, for example 400 copies of a 50 page document that may include a plurality of color pages, it would be useful to provide feedback about the progress of the job to, for example, the press operator. This information may be presented in the form of counters, progress bars, or some other representation. The operator can use this information to ensure proper system performance, and to determine when to initiate other events such as the submission of new jobs or the control of other devices.

In some systems, there is a tight coupling between the platform controlling the user interface and that performing print engine control. Indeed in many cases these functions are handled by the same computing platform. Where this is the case, status information is readily available to the user interface.

In some newer, more open and modular printing architectures, however, a first computing platform, for example, the user interface or digital front end, is not intimately involved in the actual printing process and therefore, is not directly aware of print job progress. Instead, based on a document description it receives from the digital front end, a second computing platform, typically a mark facility controller, performs the scheduling and control of the print job. In these systems, the digital front end, submits a document assembly tree to the mark facility controller. The mark facility controller then manages the job through completion, determining the optimal use of feeding, marking, and finishing resources.

A document assembly tree is a digitally coded outline describing a documents production properties. The mark facility controller receives a document assembly tree and scans it to determine which sheets, for example, call for high resolution printing, which, if any, require the services of a color mark facility, which, can be printed in low resolution etc. The mark facility controller determines the source (fax, scanner, computer file etc. . . ) of the content of each sheet and decides the optimum use of resources, so that the job is completed as efficiently as possible. The digital front end places an order for a print job, but is not involved in its production. The mark facility controller orchestrates the entire job.

The document assembly tree concept is scalable. A document assembly tree can represent an entire print job or it can represent a single document within a print job. Of course, an entire print job can consist of only one document.

An example of when a document assembly tree might represent one document within a large print job is during the printing of a mass mailing containing, for example, a sheet that includes the address of the recipient. In this situation, each copy of the mailing is represented by its own document assembly tree. Since the recipient address portion of each document is different, a particular document assembly tree contains information pointing to the source of a particular recipient address to be printed on a particular copy of the mailing.

An example of when a document assembly tree might represent an entire job is when exact copies of the same document are being produced.

In order to communicate status information to the digital front end, some systems implement a simple protocol, where messages are passed from the mark facility controller to the digital front end for each completed sheet. This has been an adequate solution to the problem of status reporting. However, as print engines become faster, sheet by sheet status information is becoming less useful. Furthermore, in distributed architectures, the automatic broadcast of status information after the production of every sheet, can absorb significant portions of the control path bandwidth. Additionally, some status initiated operations such as, the releasing of system resources back to a resource manager, require notification at intervals other than sheets or sets of sheets. A method is needed to allow the submitter of document descriptions, such as a digital front end, to specify the document segments for which progress status is desired and the intervals at which that status is to be reported.

The subject invention relates to a method to extend the document assembly tree mechanism to allow for the requesting and delivery of status information from a mark facility controller or other job coordinating computing platform, to a digital front end at selected points and at selected intervals or points in the printing process.

SUMMARY OF THE PRESENT INVENTION

One aspect of the present invention is a method for using an extended document assembly tree to generate job status reports. The method finds application in an electronic image processing apparatus comprising a plurality of machine modules that together process and/or produce printed media, the method comprises generating a document assembly tree having nodes that describe portions of a job; including in the node descriptions, keywords that specify a status report delivery interval; and, producing the job and status reports as indicated by the document assembly tree.

Another aspect of the present invention is that status reports are sent only for selected portions of a job and only when appropriate for each portion of the job.

One advantage of the present invention is that useful status information is provided to a system operator and/or supervisory devices while minimizing control bus bandwidth consumption.

Another advantage of the present invention is that it allows system resources to be freed for use by a following job or portion of a job when they are no longer required by a current job, while minimizing control bus bandwidth consumption.

Still other advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PRESENT INVENTION

Figure 1:
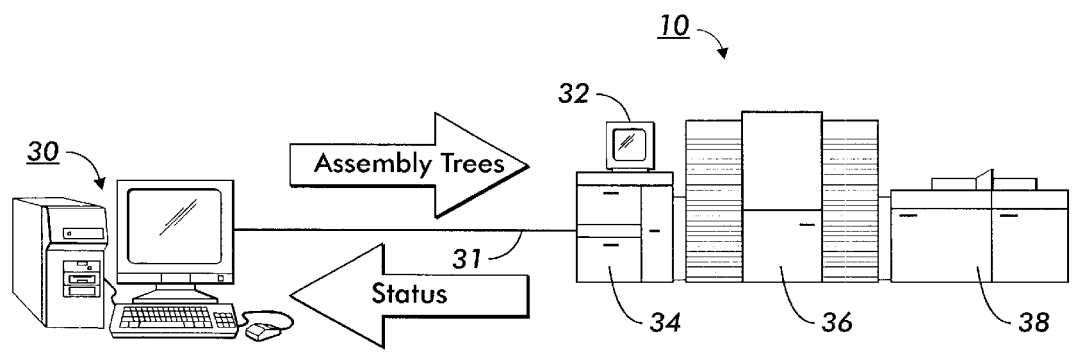
FIG. 1 shows a first arrangement of equipment in accordance with the invention.

Referring to FIG. 1, a typical digital printing system 10 may include a digital front end 30, a communications bus 31, a mark facility controller 32, a feeder device 34, a print engine 36, and a finishing device 38. The digital front end 30 is principally an operator interface, however, it may serve other functions as well, for example; it may store configuration information for jobs that are performed on a regular basis. It may also serve as an interface to other devices such as scanners, fax machines and computer networks. The mark facility controller 32 is depicted in FIG. 1 as a separate terminal but it may be built into one or more of the other modules, usually a print engine 36, and not be visible to the user. It receives job configuration information from the digital front end via the communications bus 31 and then orchestrates the fulfillment of the job by scheduling and controlling other modules. The feeder device 34 usually stores a variety of paper stock, including various size sheets, letterhead, and special purpose media such as velum. It delivers the appropriate material to the next module, typically a print engine 36, at the direction of the mark facility controller 32. The print engine then prints the appropriate image onto the media, as directed by the mark facility controller 32. Image data arrives at the print engine 36 via an image path (not shown). The finishing device 38 is also directed by the mark facility controller 32. It can be a collator, stapler, shrink wrapper or other device. In cases where the present invention is used, the mark facility controller 32 also sends status information back to the digital front end 30 via the communications bus 31 as requested in the document assembly tree.

The system described above is just one of the module configurations that might take advantage of the present invention. The system is offered as an example and is not meant to limit the invention. Other combinations comprising multiple print engines and/or multiple feeding devices and/ or multiple finishing devices may all take advantage of the present invention. The modules can be located in one room or be networked together and spread through out a facility or even through out the world. Even module configurations that do not include a print engine can take advantage of the present invention.

An example of a module configuration that does not include a print engine is that of a signature booklet maker. A signature booklet maker comprises a feeder device and a finishing device. Collated material loaded into the feeder device is fed to the finishing device. The finishing device, for example, staples the sheets in the middle and folds them into booklet form.

Figure 2:
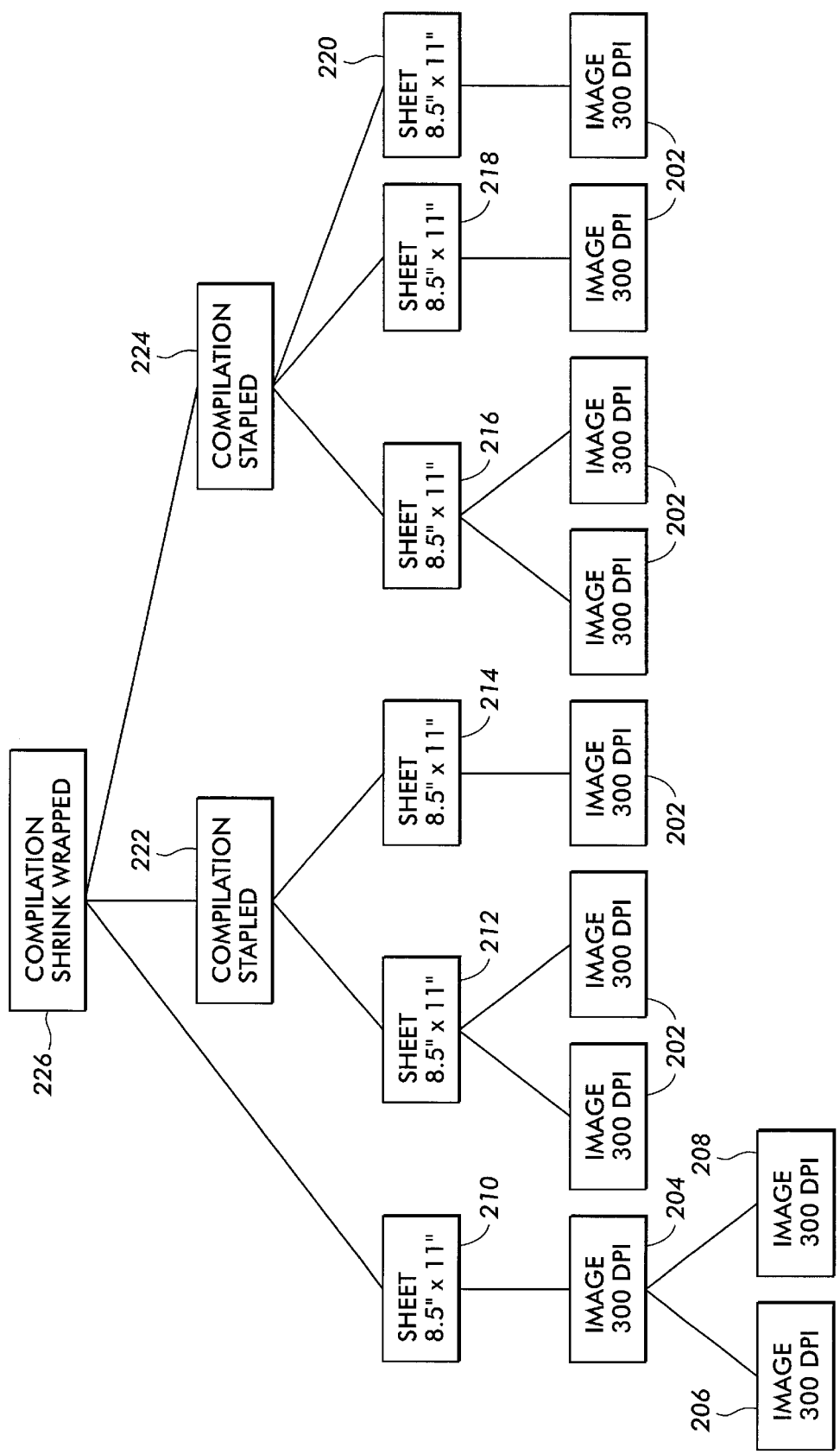
FIG. 2 is a diagram of a prior art document assembly tree showing some of the information contained in each of the nodes; and, FIG. 3 is a less detailed depiction of a document assembly tree with aspects of the present invention highlighted.

FIG. 2, illustrates an example of a prior art assembly tree structure that defines a typical document. A document is generally a set of sheets made up of multiple images. For example, various images as illustrated at 202 are combined to provide sheets 212, 214, 216, 218, and 220. It should be understood that any of the images 202 can be the product of several sub-images, for example, image 204 is shown as being a combination of sub-images 206 and 208. As will also be understood, a sheet can be any combination of images and sub-images. For example, sheets 212 and 216 are illustrated, each as a combination of two images.

A compilation is a combination of multiple sheets. For example, compilation node 222 is a combination of sheet nodes 212 and 214 and compilation node 224 is a combination of sheet nodes 216, 218, and 220. As shown, the compilation nodes 222 and 224 are for the purpose of stapling sheets. A compilation can also be a combination of sheets and other compilations. For example, compilation node 226, for a shrink wrap operation, is a compilation of sheet node 210, compilation node 222 and compilation node 224. As illustrated, the assembly tree nodes comprise images, sheets, and compilations.

Compilations may have any number of groupings or off-spring. Sheets may have front and/or back images. Images may have sub-images, recursively. All nodes may have properties such as size or weight. All nodes may have finishing specifications such as staple or trim. All properties and finishing identifiers are expressed through universally registered keywords.

Each node contains summary information about the part of the print job that it represents. For example, the top compilation node 226 specifies that the compilation is to be shrink wrapped. Sheet node 210 specifies a paper size of 8½×11 inches. Image node 204 specifies a resolution of 300 dots per inch and that the sheet is made up of two other images represented by image node 206 and image node 208. As mentioned above, the nodes contain other specifications as well. The other specifications are not shown, for purposes of brevity.

A computing platform, such as a mark facility controller, traverses the document assembly tree and interprets these specifications. For example, a paper size specification is interpreted and results in a command to a feeder device to provide that size media. A resolution specification may result in a print engine selection, where there are more than one print engine available, or a print mode selection where the print engine may be driven in a fast, low resolution mode or a slow or high-resolution mode.

The invention extends the functionality of the document assembly tree by adding a new kind of registered keyword to the lexicon of possible keywords. The keyword that is added is a report interval specification. If it is set to zero in a given node then no report is ever made when that particular node is processed. If some other number is specified, for example 10, then the mark facility controller 32 reports to the digital front end 30, that it is processing that node every tenth time it does so. The digital front end 30 may then use that information to update its operator display or for other purposes.

Figure 3:
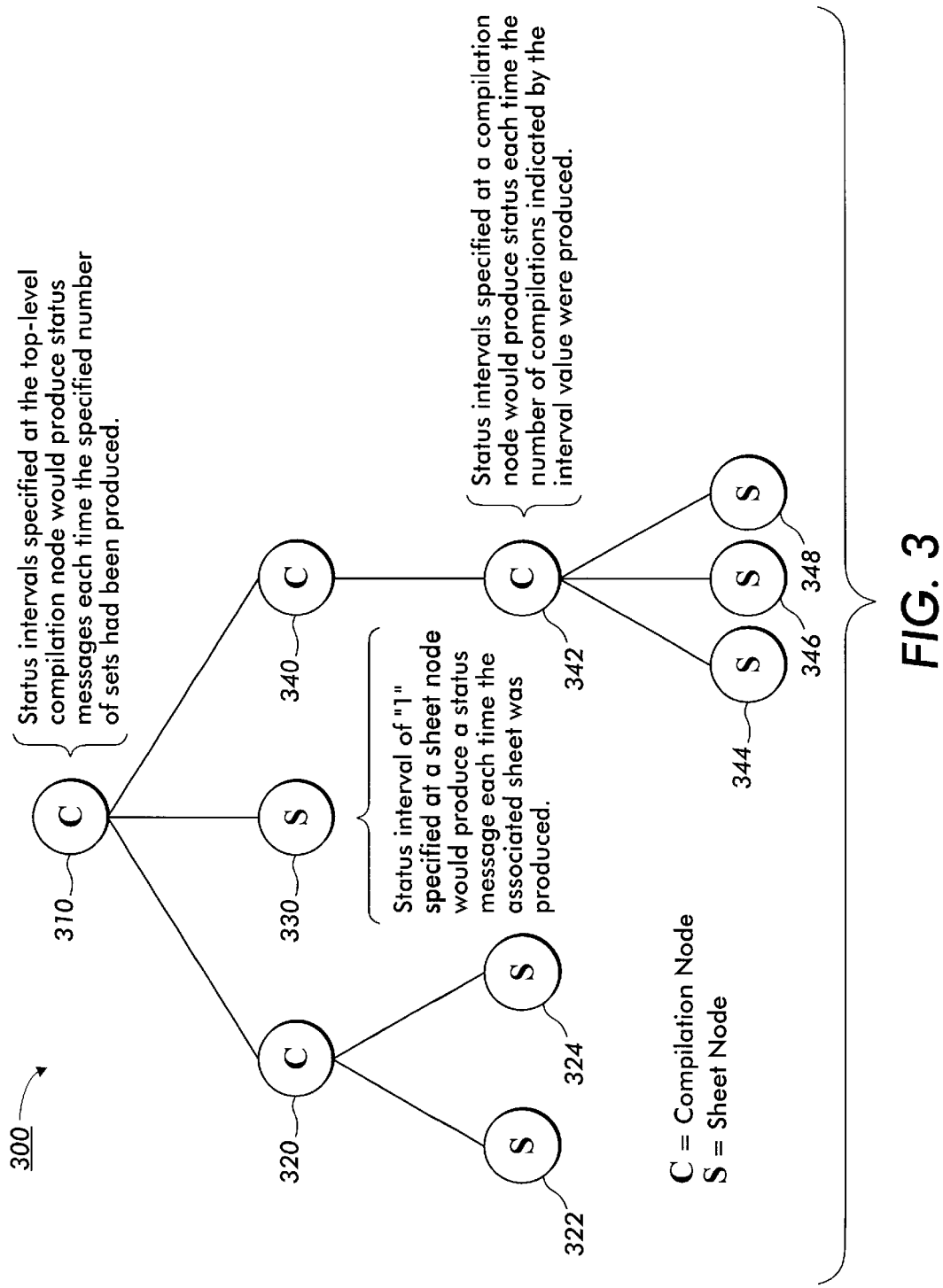

FIG. 3 is a simplified depiction of a document assembly tree that illustrates how the report frequency specification of the present invention might be used. Top compilation node 310 calls for the inclusion of a first compilation node 320 which itself is comprised of a first sheet node 322 and a second sheet node 324. Top compilation node 310 also includes a third sheet node 330 and a second sub compilation node 340. Sub compilation node 340 calls for the inclusion of a fourth sub compilation node 342 which in turn calls for the inclusion of fourth, fifth and sixth sheet nodes 344, 346, and 348.

The Figure also shows how a report frequency specification of 1 specified in a top compilation node 310 would direct the mark facility controller 32 to send a status message to the digital front end every time it completes a top compilation. Additionally setting the report frequency specification to 1 in the third sheet node 330 would generate a status report every time the sheet it represents is produced. Lastly, a report frequency specification entered in the third sub-compilation node 342 generates a report every time the number of sub-compilations specified, is completed.

If the document assembly tree 300 represents, for example, a copy of a mass mailing document containing, for example, a recipients address, then the top compilation node 310 is only processed once. Under those circumstances setting the report frequency keyword in the top compilation. node 310 to 1 will only generate 1 status report.

If on the other hand the document assembly tree 300 represents a printing job for many copies of the same document without any changing portions, then setting the report interval keyword in the top compilation node 310 to 1 will generate a status report after the completion of each copy of the document.

The invention has been described with reference to the preferred embodiment. obviously, modifications and alterations will occur to others upon reading and understanding the preceding detailed description. It is intended that the invention be construed as including all such modifications and alterations insofar as they come with the scope of the appended claims or equivalents thereof.

What is claimed is:

1. In an electronic image processing apparatus comprising a plurality of machine modules for processing and/or producing printed media, a method for generating job status reports, the method comprising:

generating a document assembly tree having nodes describing portions of a document;

including in the node descriptions, keywords that specify a status report delivery interval, and;

producing the job and status reports as indicated by the document assembly tree.

2. The method of claim 1 wherein steps of generating a document assembly tree and including keywords are performed at least in part, by a first computing platform and the step of producing the job is performed at least in part, by a second computing platform, the producing step further comprising:

the first computing platform submitting the document assembly tree to the second computing platform.

3. The method of claim 1 wherein the step of producing the job further comprises:

checking each node for a status report delivery interval specification;

when processing a node that contains a status report delivery interval specification, comparing that interval with the current interval; and, if the sample interval has been reached, sending a status report to the first computing platform.

4. The method of claim 3 wherein the status report delivery interval is measured in the number of copies produced.

5. An apparatus comprising a plurality of machine modules for processing and/or producing printed media comprising:

a first computing platform for, at least in part, generating a document assembly tree, the document assembly tree having nodes describing portions of a document and including in the descriptions, keywords that specify a status report delivery interval, and;

a second computing platform for controlling the plurality of modules to produce or process the job and status reports as indicated by the document assembly tree.

6. The apparatus of claim 5 wherein the first computing platform is a digital front end.

7. The apparatus of claim 5 wherein the second computing platform is a mark facility controller.

* * * * *

UNITED STATES PATENT AND TRADEMARK OFFICE
CERTIFICATE OF CORRECTION

PATENT NO. : 6,480,293 B1
DATED : November 12, 2002
INVENTOR(S) : Gregg A. Bonikowski et al.

It is certified that error appears in the above-identified patent and that said Letters Patent is hereby corrected as shown below:

<u>Column 6,</u>
Line 18, delete "sample interval" and insert therefor -- status report delivery interval --

Signed and Sealed this

Sixth Day of January, 2004

JAMES E. ROGAN
*Director of the United States Patent and Trademark Office*